United States Patent
Foglar

(10) Patent No.: US 6,356,552 B1
(45) Date of Patent: Mar. 12, 2002

(54) METHOD BY WHICH SETS OF VALUES REPRESENTING VARIOUS PARAMETERS CAN BE ALLOCATED TO ADDRESSES

(75) Inventor: Andreas Foglar, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/272,670

(22) Filed: Mar. 18, 1999

Related U.S. Application Data

(63) Continuation of application No. PCT/DE97/01847, filed on Aug. 25, 1997.

(30) Foreign Application Priority Data

Sep. 18, 1996 (DE) .......................................... 196 38 174

(51) Int. Cl.$^7$ ................................................. H04L 12/28
(52) U.S. Cl. ..................... 370/395.1; 370/474; 370/475
(58) Field of Search ................................. 370/392, 395, 370/397, 399, 465, 410, 230, 235, 393, 394, 351, 474, 477, 522, 475

(56) References Cited

U.S. PATENT DOCUMENTS

| | | | |
|---|---|---|---|
| 4,999,835 A | 3/1991 | Lagoutte ..................... | 370/389 |
| 5,414,701 A | 5/1995 | Shtayer et al. .............. | 370/395 |
| 5,481,687 A | 1/1996 | Goubert et al. ............. | 711/212 |
| 5,515,370 A | 5/1996 | Rau ........................... | 370/399 |
| 5,557,609 A | 9/1996 | Shobatake et al. .......... | 370/395 |
| 5,719,864 A * | 2/1998 | Badger et al. .............. | 370/397 |
| 5,912,892 A * | 1/1999 | Barnhart et al. ............ | 370/397 |
| 6,151,314 A * | 11/2000 | Rauhala ..................... | 370/392 |

FOREIGN PATENT DOCUMENTS

EP 0 500 238 A1 8/1992

OTHER PUBLICATIONS

Ph. Oechslin: "ALI: A versatile Interface Chip For ATM Systems", Comm. F. Global users, Orlando, Dec. 6, 1992, Inst. Of Electr. And Electron. Engineers, pp. 1282–1287.

* cited by examiner

*Primary Examiner*—Seema S. Rao
(74) *Attorney, Agent, or Firm*—Herbert L. Lerner; Laurence A. Greenberg; Werner H. Stemer

(57) ABSTRACT

A method is described, by which sets of values representing various parameters can be allocated to addresses, at which addresses data pertaining to the various value sets can be stored in memory. The method described is characterized in that the allocated addresses are each formed by a concatenation of address components representing the individual values of a given set of values, and the scope of the various address components and/or the order of the various address components in their concatenation can be varied individually as a function of configuration parameters that have an influence on the ranges of values of the parameters.

14 Claims, 4 Drawing Sheets

METHOD BY WHICH SETS OF VALUES REPRESENTING VARIOUS PARAMETERS CAN BE ALLOCATED TO ADDRESSES

CROSS-REFERENCE TO RELATED APPLICATION

This is a continuation of copending International Application PCT/DE97/01847, filed Aug. 25, 1997, which designated the United States.

BACKGROUND OF THE INVENTION

FIELD OF THE INVENTION

The present invention relates to a method by which sets of values representing various parameters can be allocated to addresses, at which addresses data pertaining to the various value sets can be stored in memory.

One such method can be employed in a switching method known as Asynchronous Transfer Mode (ATM), among others, a method that is used in so-called broadband ISDN or B-ISDN, for instance.

The Consultative Committee for International Telephony and Telegraphy (CCITT) already called on the switching method known as Asynchronous Transfer Mode (ATM) in May 1990 as a standard for so-called data packet switching in B-ISDN. It defines ATM as follows: "A switching method in which the information is bunched in cells; the method is asynchronous in the sense that the cells need not necessarily be exchanged periodically between the transmitter and the receiver". One possible embodiment for performing the ATM method is shown in FIG. 4.

The system shown there includes a switching station, which outputs data packets (ATM cells) received over first lines correspondingly to the respective destination site over second lines, and vice versa.

The first lines are glass fiber cables terminated by first termination units. The first termination units are the practical embodiment of so-called PHYs (physical ports).

The second lines, which are also embodied as glass fiber cables, are terminated by second termination units. Like the first termination units, the second termination units are the practical embodiment of so-called phys (physical ports).

The switching station includes a first ATM unit (shown on the left in FIG. 4), a second ATM unit (shown on the right in FIG. 4), and a coupling network disposed between them.

The first termination units are connected to the first ATM unit, and the second termination units are connected to the second ATM unit.

The ATM cells arriving at the switching station, or more precisely at the ATM units thereof, have a cell header in which, among other information, the destination site or the receiver of the particular ATM cell is defined in a 28-bit address field.

The 28-bit address has two components, namely a 16-bit VCI part and a 12-bit VPI part. VCI stands for Virtual Channel Identifier and designates the connection end point to which the useful data contained in the applicable ATM cell are to be switched. VPI stands for Virtual Path Identifier and designates a subscriber system that includes many connection end points, to which system the useful data contained in the applicable ATM cell are to be switched.

The first and second ATM units include a non-illustrated connection status information memory, in which for each connection, or more precisely for each VPC (Virtual Path Connection) and for each VCC (Virtual Channel Connection), which is made via the switching station, certain data (connection status information) are stored. The data to be stored include approximately 200 bytes per connection, and thus are relatively extensive.

The 28 bits in the header region of each ATM cell reserved for specifying the receiver of a given ATM cell make it possible to establish $2^{28}$ different connections. If a memory region large enough to enable storing the aforementioned connection status information in it were to be reserved for each of the connections in this enormous number of possible connections, this would require the provision of a memory with a huge storage capacity.

A memory with such a large storage capacity is feasible only at the greatest possible technological effort and expense, since in practice only an extremely small fraction of the theoretically possible number of connections is or can be made at the same time and each is used for only an extraordinarily small fraction of the time.

It is therefore preferable to use a memory whose storage capacity is oriented "only" to the maximum number of connections that can be made simultaneously. In that case, however, the memory can no longer be addressed directly through the 28-bit address in the header region of the ATM cells. Instead, it requires address conversion or a special address allocation. More precisely, it requires the use of a method by which sets of values representing various parameters can be assigned to addresses at which data pertaining to the various value sets can be stored; the various parameters in the example here are VPI, VCI, and possibly also PN (Physical Port Number) and which is the number of a termination unit or a line over which the applicable ATM cell was received. The address to be assigned to the various value sets will hereinafter be called the LCI (for Logical Channel Identifier).

In performing such allocations, it is known to make use of an (auxiliary) memory that is preoccupied with values in such a way that the address (LCI) to be allocated to a given value set (VPI, VCI, PN) is either the address of that memory region whose contents correspond to the value set, or the contents of the memory region that can be addressed using the value set as an address.

The first of these cases is practically feasible by using a so-called content addressable memory (CAM) as the (auxiliary) memory. In CAMs, a comparator is provided for each memory region, and by this comparator data (value sets) applied to the memory can each be compared with the contents stored in the applicable memory region. This comparison is performed simultaneously for all the memory regions by the comparators assigned to the various memory regions and is therefore done very quickly. As a result, the address of the row in which the data corresponding to the value set are stored is obtained; this row address is at the same time the address LCI to be assigned to the value set. It can be appreciated that this kind of practical embodiment of the address allocation is relatively complicated, because of the large number of comparators that must be provided and operated simultaneously.

The second case above can be embodied by a "normal" (auxiliary) memory, which is preferably subdivided hierarchically into a plurality of memory units. Such a system is shown in FIG. 5. It includes a first memory unit, a second memory unit, and a third memory unit The first memory unit is addressed by the physical port number PN; the second memory unit is addressed on the basis of the virtual path identifier VPI, or more precisely by a base address $P_{VPI}$+VPI obtained from the first memory unit, and the third memory unit is addressed on the basis of the virtual channel identifier VCI, or more precisely by a base address $P_{VCI}$+VCI obtained from the second memory unit. The data stored at the various addresses of the individual memory units are either directly the addresses (LCI) to be allocated to the applicable value sets, or are pointers P, which point to the beginning of an assigned memory region of the respectively lower-ranking memory unit. For among other reasons because of the fact that the LCI values to be ascertained and allocated in real time are obtained by an intrinsically slow, multistage method, this kind of practical realization of address allocation again proves to be relatively complex.

This kind of multistage method for ascertaining an address with a reduced number of bits is known from U.S. Pat. No. 5,481,687.

It is also known from U.S. Pat. No. 5,557,609 to extract an ATM cell from the 28-bit address in the header region by shifting the VPI and VCI parts bit by bit. By subsequently shortening the VPI and VCI values, an address with a reduced number of bits is generated for addressing a memory that contains conversion data.

The above-described methods, however, require not only complex hardware, that is, high-speed and/or extensive hardware, but also, for instance when the system configuration is expanded and/or changed, because of the (auxiliary) memory expansion or expansions then required and/or the change in memory contents then required, can be adapted to the altered conditions only at relatively major effort and expense.

SUMMARY OF THE INVENTION

It is accordingly an object of the invention to provide a method by which sets of values representing various parameters can be allocated to addresses that overcomes the above-mentioned disadvantages of the prior art methods of this general type, in which the address allocation sought is always feasible in a simple way and at minimal effort and expense.

With the foregoing and other objects in view there is provided, in accordance with the invention, a method by which sets of values representing various parameters can be allocated to addresses, and at the addresses, data pertaining to the sets of values can be stored in memory, which includes: forming allocated addresses from address components formed by concatenation of individual values of a value set, and at least one of a scope of the address components and an order of the address components in the concatenation can be varied individually in dependence on configuration parameters that have an influence on ranges of values of the various parameters.

It is accordingly provided that the allocated addresses are each formed by a concatenation of address components representing the individual values of a given set of values, and the scope of the various address components and/or the order of the various address components in their concatenation can be varied individually as a function of configuration parameters that have an influence on the ranges of values of the parameters.

The address to be allocated to a given set of values is accordingly no longer, as was the case previously obtained by using an association table realizable by an auxiliary memory or the like, but instead by the concatenation of address components representing the values of the applicable value set in a way adapted to given conditions.

Accordingly, a method which includes corresponding the address components to values of a given set, canceling elements of no significance for address forming, and replacing canceled elements with other elements has been provided.

The few circumstances (configuration parameters) on which the generation of the address to be allocated depends, and the few and slight effects thereof on address forming (change in the length and order of the concatenated address components) are advantageous in two respects. First, the hardware to be furnished for performing the method can be of low complexity and structured simply. Second, for adaptation of the method to changed circumstances, all that is required is to modify a few parameters representing the applicable circumstances.

Accordingly, a method has been discovered through which the sought address allocation can always be realized simply and at minimal expense.

Other features which are considered as characteristic for the invention are set forth in the appended claims.

Although the invention is illustrated and described herein as embodied in a method by which sets of values representing various parameters can be allocated to addresses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
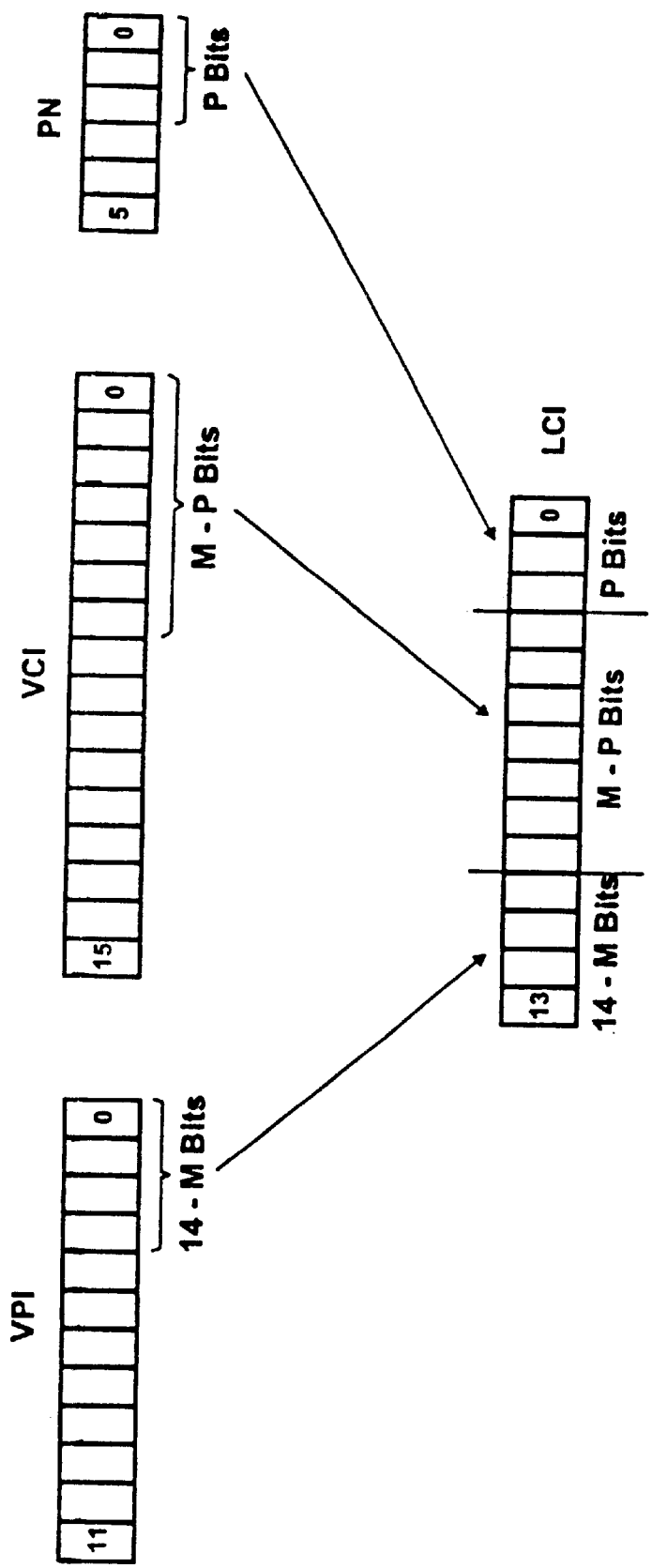
FIG. 1 is a diagrammatic illustration of the forming of an address to be allocated to a set of values according to the invention.

In all the figures of the drawing, sub-features and integral parts that correspond to one another bear the same reference symbol in each case. Referring now to the figures of the drawing in detail and first, particularly, to FIG. 1 thereof, there is shown an exemplary embodiment on the basis of which a method of the invention will be described in detail below that relates to an address conversion to be performed in an asynchronous transfer mode (ATM) switching station. More precisely, to the method by which addresses can be assigned to values representing sets of various parameters (VPI, VCI, PN), at which addresses data (connection status information) pertaining to the various value sets can be stored.

However, the method of the invention can be used not only in ATM switching technology but also quite generally anywhere that arbitrary sets of values representing arbitrary parameters are to be assigned addresses at which data pertaining to the various value sets can be stored. The use of the method of the invention proves to be especially advantageous in cases where the capacity of a memory intended for data storage is not sufficient to be addressed directly via the set of values.

Figure 4:
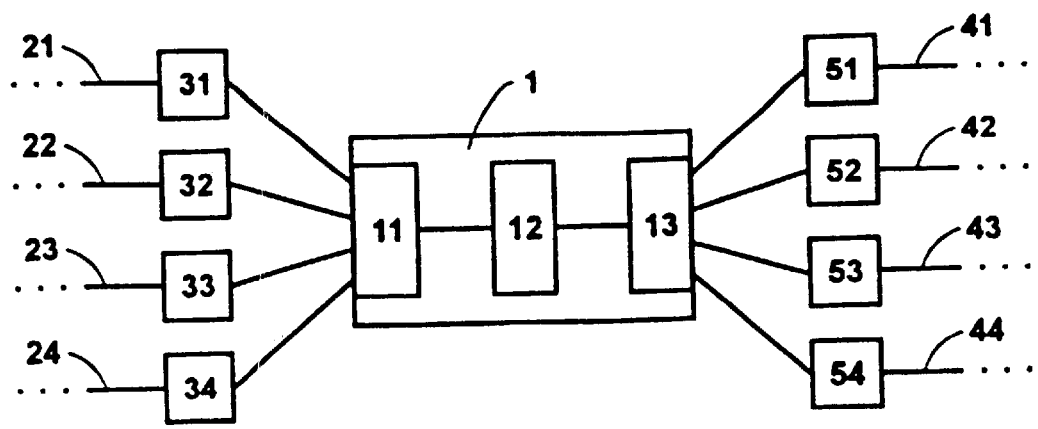
FIG. 4 is a block diagram of a system in which both conventional address allocation methods and the address allocation method of the invention can be employed.

The basic outlines of the ATM switching method have already been described extensively at the outset above with reference to FIG. 4. The basic layout of the system shown in FIG. 4 is unchanged by the use of the method of the invention; the comments in this respect already made are therefore fully valid below unless expressly stated otherwise.

A first ATM unit 11 of a switching station 1 receives data packets in a form of ATM cells over lines 21–24 which are glass fiber cables terminated by termination units 31–34. The data packets are to be switched to lines 41–44 via a coupling network 12, a second ATM unit 13, and the lines 41–44 which are glass fiber cables terminated by termination units 51–54. Conversely, the second ATM unit 13 of the switching station 1, over the lines 41–44 and the termination units 51–54, receive data packets in the form of the ATM cells that are to be switched to the lines 21–24 via the coupling network 12, the first ATM unit 11, and the termination units 31–34.

The intended destination of the various ATM cells is defined in their header, in the form of a 28-bit address. By this 28-bit address, $2^{28}$ destination sites can be defined. However, the number of possible destination sites is not also equal to the number of connections that can be made (maintained) via a switching station and for which corresponding connection status information is to be stored. The maximum number of connections that can be made at the same time is assumed to be 16 K, in the example shown in FIG. 4.

This value is drawn from an officially announced recommendation, which says that over a line by which a data quantity of 150 MBits/s can be transmitted, as in the case of the glass fiber cables 21–24 and 41–44 shown in FIG. 4, no more than 4 K connections are to be made. It does not matter whether the connections are the virtual path connections (VPCs) already mentioned, or the virtual channel connections (VCCs), also already mentioned above.

Clearly, the memory that must be furnished for storing connection status information for 16 K connections cannot be addressed directly via the 28-bit address in the header of the ATM cells. This is especially true for the case where the address at which the data pertaining to a particular connection are to be stored is supposed to be made additionally dependent on which of the lines or termination units have been used for receiving the ATM cell to be switched.

The address that is generated for addressing the connection status information memory is the logical channel identifier (LCI) value already mentioned at the outset. If it is to be able to represent 16 K different addresses, the LCI value must include 14 bits.

In the present example, the LCI value, used as a reduced address, includes precisely the aforementioned 14 bits; its contents depend on the (12-bit) VPI value, the (16-bit) VCI value, and the (in this case) six-bit PN value. For the sake of completeness, it should be pointed out again here that the VPI (Virtual Path Identifier) value and the VCI (Virtual Channel Identifier) value jointly form the 28-bit address in the header of the ATM cells, and that the PN (Physical Port Number) value represents the number of the line or termination unit from which the applicable ATM cell has been received.

The aforementioned LCI value is obtained from a concatenation of the address components, of which the first address component is based on the PN value, the second address component is based on the VCI value, and the third address component is based on the VPI value.

Figure 5:
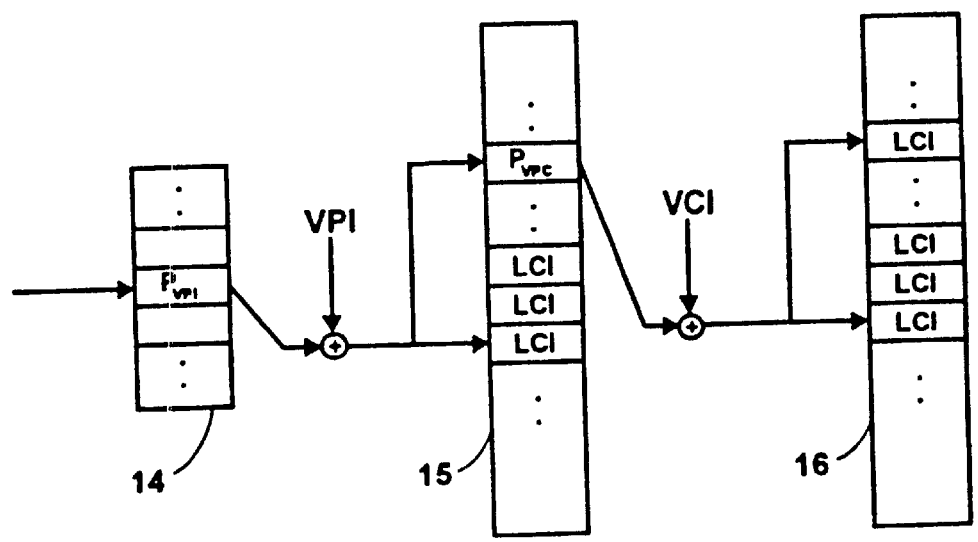
FIG. 5 is an illustration explaining a conventional address allocation method.

FIG. 5 shows a conventional addressing allocation method. It includes a first memory unit 14, a second memory unit 15, and a third memory unit 16. The first memory unit 14 is addressed by the physical port number PN. The second memory unit 15 is addressed on the basis of the virtual path identifier VPI, or more precisely by a base address $P_{VPI}$+VPI obtained from the first memory unit 14. The third memory unit 15 is addressed on the basis of the virtual channel identifier VCI, or more precisely by a base address $P_{VCI}$+VCI obtained from the second memory unit 15. The data stored at the various addresses of the individual memory units are either directly the addresses (LCI) to be allocated to the applicable value sets, or are pointers P, which point to the beginning of an assigned memory region of the respectively lower-ranking memory unit. For among other reasons because of the fact that the LCI values to be ascertained and allocated in real time are obtained by an intrinsically slow, multistage method, this kind of practical realization of address allocation again proves to be relatively complex.

In accordance with the invention, the size and order of the arrangement of the address components encompassing a total of 14 bits depends, among other factors, on whether the VPI value of the applicable ATM cell is less than a value of $2^V$, or not. $2^V$ is the number of the first VPC (Virtual Path Connection) in the switching station, among the VPCs numbered sequentially from zero upward by the VPIs, that is not resolved, or in other words that is switched onward as is. V is a first configuration parameter, which is obtained from the (user-settable) configuration of the system and which must be known in order to perform the address allocation described.

For the sake of better comprehension, it is important to know which kinds of connections there are, and how they are to be handled by the switching station. The connections that can be made by an ATM switching station can be grouped, as already indicated several times above, in two classes, namely VCCs (Virtual Channel Connections) and VPCs (Virtual Path Connections). The VCCs are single connections made individually to quite specific subscriber terminals at the time. The VPCs are collective connections (for instance, between switching stations or to subscriber systems that include a plurality of subscriber terminals), in each of which an entire bunch of VCCs that can be manipulated uniformly can be combined. To enable the VCCs combined in them to be switched onward individually (to take separate paths), VPCs can be resolved in a switching station; as a result, from one VPC, many VCCs can be created. However, VPCs can also be switched onward as is, in other words without being resolved.

By suitable system configuration before the system is put into operation, it is defined how many of the theoretically possible $2^{12}$ VPCs in the applicable switching station are to be resolved, and which individual VPCs these will be. The VPCs are assigned numbers by the VPIs, and VPIs from 0 to $2^V-1$ are assigned to those VPCs that are to be resolved in the applicable switching station, while the VPCs that are not resolved in the switching station are identified by the numbers that are greater than $2^V-1$.

In other words, the way in which the applicable LCI value is generated depends, among other factors, on whether the applicable VPC is resolved in the switching station or is retained as is. This can be ascertained, as already mentioned above, by checking whether $$VPI < 2^V \quad \text{a)}$$

or $$VPI \geq 2^V. \quad \text{b)}$$

The procedure for case a) above, that is, the case in which the applicable VPC is resolved in the switching station, is shown in FIG. 1. FIG. 1 schematically shows a VPI value including 12 bits (bits 0 through 11), a VCI value including 16 bits (bits 0 through 15), and a PN value including 6 bits (bits 0 through 5), as well as an LCI value including 14 bits (bits 0 through 13). The LCI value is composed as follows of portions of the VPI value, the VCI value, and the PN value:

1) the low-order P bits of the LCI value are the lowest-order P bits of the PN value;
2) the highest-order 14-M bits of the LCI value are the lowest-order 14-M bits of the VPI value; and
3) the intervening M–P bits of the LCI value are the lowest-order M–P bits of the VCI value.

The aforementioned value P is a second configuration parameter, which represents the number of lines or termination units (PHYs) with which the applicable ATM unit is connected. In the example in question, $2^P$ is equal to the number of lines or termination units connected to the applicable ATM unit. The value to be defined for P is obtained from the (user-determinable) configuration of the system and in the example in question must be known in order to perform the address allocation described.

Shortening the originally six-bit PN value to P bits (in the examples shown in FIGS. 1 and 2, P=3) does not result in any loss of information, since the (highest-order) bits of the PN value that are left out in the LCI value were already equal to zero, as can be seen from the applicable configuration.

The aforementioned value M is a third configuration parameter, which represents the number of blocks into which connection status information memory to be addressed by the LCI value is subdivided. In the example in question, $2^M$ is equal to the number of the blocks of the connection status information memory. The number of blocks into which the connection status information memory is to be divided is obtained from the number of VPCs that are not to be resolved in the switching station but instead are to be switched onward as is. All the items of connection status information pertaining to these VPCs (and only these items of information) must be given space in the topmost of the blocks of the connection status information memory, for reasons that will be addressed in further detail below. The value to be defined for M is obtained from the (user-determinable) configuration of the system and in this example must be known, if the method of the invention is to be performed.

Shortening the originally 12-bit VPI value to 14-M bits (14-M, in the examples shown in FIGS. 1 and 2 equals 4) does not result in any information loss, because the (highest-order) bits of the VPI value left out in the LCI value were already always equal to zero in the applicable configuration.

Shortening the originally 16-bit VCI value to M–P bits (in the examples shown in FIGS. 1 and 2, M–P equals 7) also results in no loss of information, because the (highest-order) bits of the VCI value left out in the LCI value were already always equal to zero in the applicable configuration.

The fact that no loss of information can ensue from concatenating the address components representing the VPI, VCI and PN values can also be seen from the fact that the 14 bits of the LCI values, composed as described, suffice precisely to enable representing the maximum required 16 K addresses for storing the connection status information.

Figure 2:
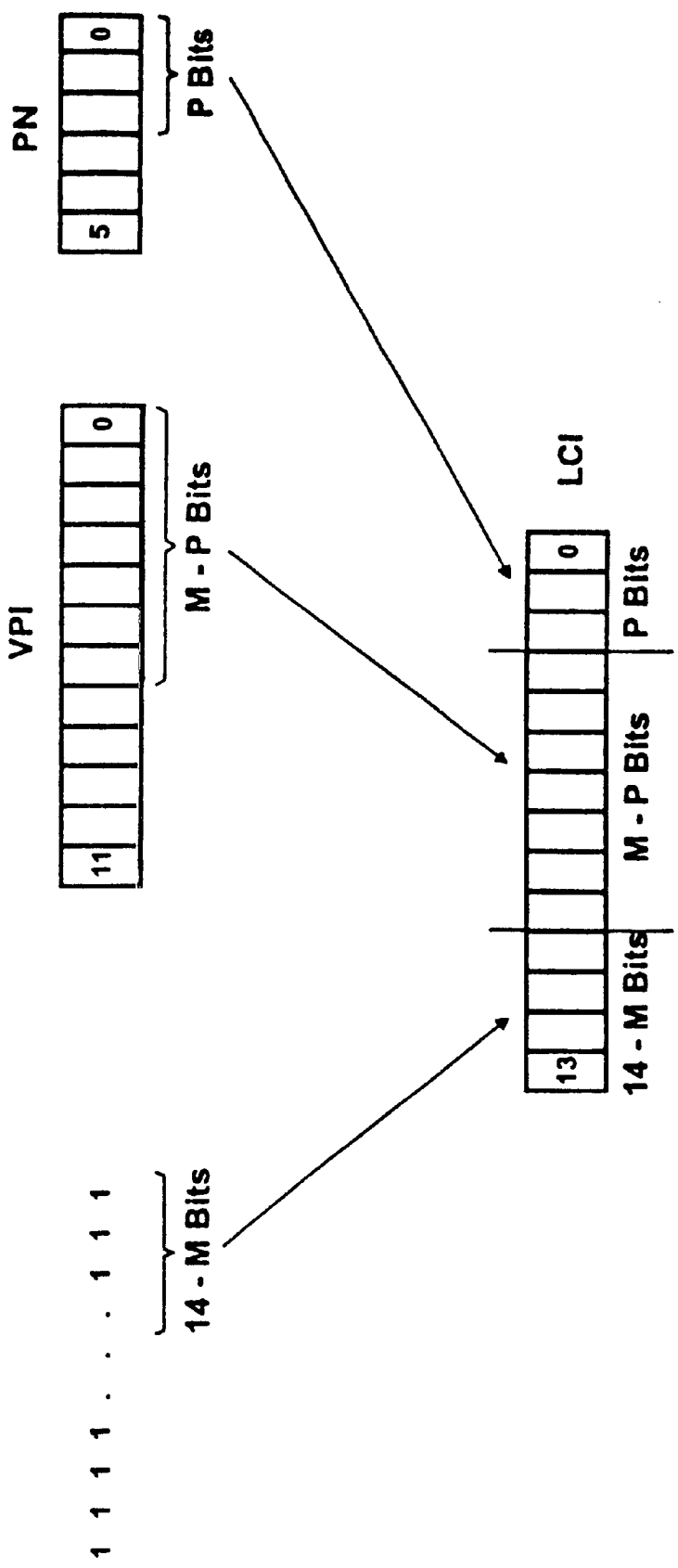
FIG. 2 is an illustration of the forming of the address to be allocated to another set of values.

The composition of the PCI values in case b), that is, where the applicable VPC is not resolved in the switching station, is shown in FIG. 2. FIG. 2, similarly to FIG. 1, schematically shows a VPI value including 12 bits (bits 0–11), a PN value including six bits (0 through 5), and an LCI value including 14 bits (bits 0–13). The LCI is composed of parts of the VPI value, VCI value, and PN value, as follows:

1) the lower-order P bits of the LCI value are the lowest-order P bits of the PN value;
2) the highest-order 14-M bits of the LCI value are occupied by ones; and
3) the intervening M–P bits of the LCI value are the lowest-order M–P bits of the VPI value.

P and M are the (second and third) configuration parameters already defined at length above.

The LCI values generated for cases a) and b) differ in terms of the highest-order 14-M bits and the M–P bits below them. The highest-order 14-M bits are used to select one of the blocks into which the connection status information memory is divided.

In case b), which pertains to the VPCs that are not resolved in the switching station, the block address is set fixedly at 1 . . . 1, that is, the maximum possible value. As a result, the topmost block of the blocks of the connection status information memory is addressed. This is also desired, because the connection status information pertaining to the VPCs that are not to be resolved is to be stored, as already mentioned above, precisely there and only there. Since only those items of connection status information that pertain to VPCs not to be resolved in the switching station are to be stored in the topmost block of the blocks of the connection status information memory, they can be addressed only via the VPI values stored in the middle portion of the LCI value. VCI values are needed because of the lack of resolution of the VPCs, and so logically they continue not to be taken into account in case b).

In case a), which pertains to the VPCs that are to be resolved in the switching station, the block address represented by the highest-oriented 14-M bits is equal to the applicable VPI value that in case a) can never represent the topmost block of the blocks of the connection status information memory. This is also desired, because the connection status information pertaining to the VPCs to be resolved is meant to be deposited in the lower blocks, or more specifically in all the blocks except for the topmost block. Because only those items of connection status information that pertain to VPCs to be resolved in the switching station are to be stored in all the blocks except the topmost block of the connection status information memory, they are meant to be addressed additionally via the VCI values stored in the middle portion of the LCI value. The address component representing the VCI value, because of the many VCCs that can be combined in one VPC, is the largest of the address components from which the LCI value is composed. As already mentioned above, the (highest-order) bits of the VPI, VCI and PN values that have been left out in the formation of the LCI value contain only zeroes in each case, so that no information loss ensues. To assure that this is indeed the case, it may be provided that this be checked in each case. If in such a check it is found that one or more of the bits that are to be left out in the individual values are not equal to zero, then this is an indication of an error, which requires special handling. The special handling may for instance be that the affected ATM cell is not switched. This makes it possible at least to prevent to already existing connections from being impeded.

In conclusion, with reference to FIG. 3, an apparatus for performing the method of the invention will be explained.

Figure 3:
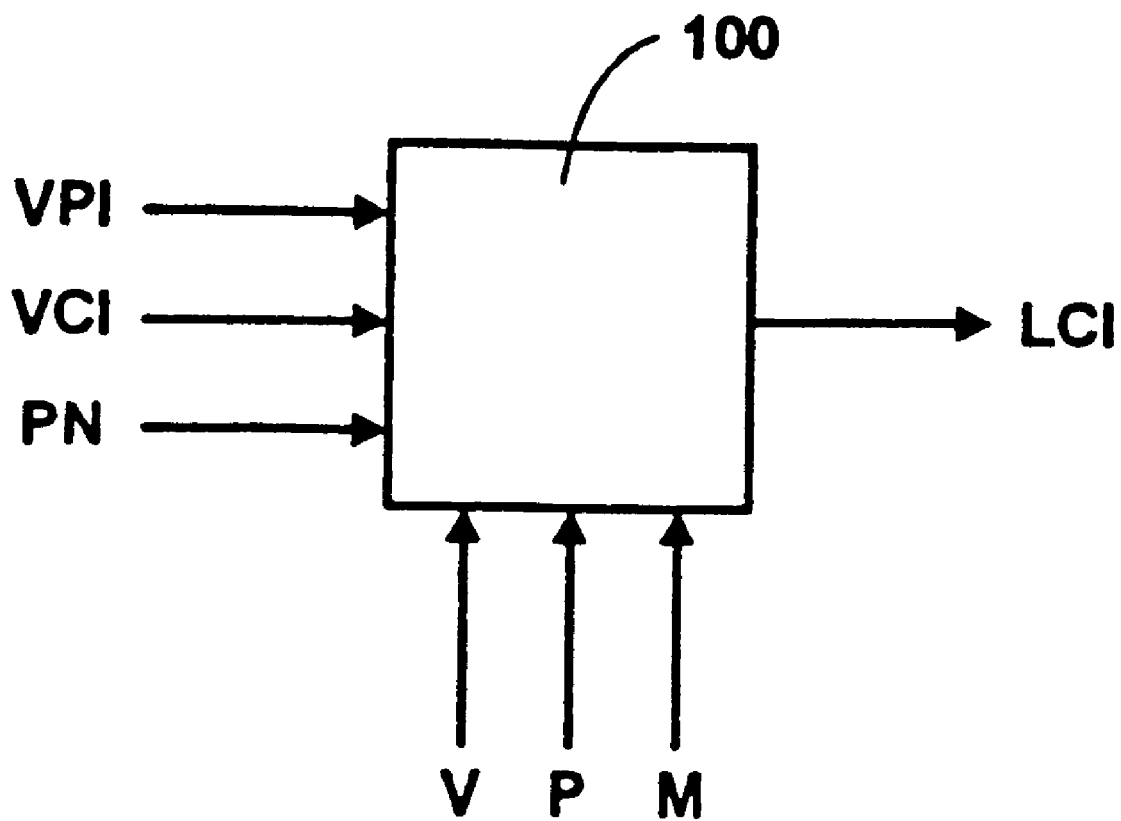
FIG. 3 is a block diagram of an apparatus for performing the method of the invention.

The method described above is performed in an address allocation unit 100 shown in FIG. 3. The set of values to which the LCI value to be generated is to be allocated, and a series of configuration parameters, are input as input signals into this address allocation unit 100.

The aforementioned set of values includes the 12-bit VPI value (from the header of the ATM cell), the 16-bit VCI value (also from the header of the ATM cell), and the 6-bit pn value.

The aforementioned configuration parameters include the first, second and third configuration parameters already explained above, more precisely a four-bit V value, a three-bit P value, and a four-bit M value.

An address at which data (connection status information) pertaining to the value set can be stored in a connection status information memory is allocated to the set of VPI, VCI and PN values, taking the configuration parameters into account. The way in which this address is formed is done has been described above at length with reference to FIGS. 1 and 2.

This address is output from the address allocation unit 100 in the form of a 14-bit LCI value.

The configuration parameters V, P and M input into the address allocation unit 100 are "only" representatives of the actual configuration parameters $2^V$, $2^P$ and $2^M$. Inputting the configuration parameters in the form of exponents to the base 2 makes it possible on the one hand to keep the number of terminals provided for inputting the configuration parameters into the address allocation unit low, and on the other to enable further processing of the thus-input values directly, that is, without additional preprocessing. Nevertheless, naturally it is also possible to provide that the configuration parameters are input in full, rather than in the form of exponents as proposed. Nor is there any restriction regarding inputting the configuration parameters in the form of exponents to the base 2; the base value may be any arbitrary other value instead.

Nor is there any restriction that the individual configuration parameters represent precisely those variables indicated in the above description. Alternatives that at least in part are more or less equivalent are conceivable. For instance, the first configuration parameter V can represent the size, instead of the number, of the applicable blocks of the connection status information memory.

In summary, it can be stated that with the method of the invention, a method has been discovered by which the address allocation sought can always be achieved simply and at minimal effort and expense.

I claim:

1. A method by which sets of values representing various parameters can be allocated to addresses, and at the addresses, data pertaining to the sets of values can be stored in memory, which comprises:
   forming allocated addresses from address components formed by concatenation of individual values of a value set, and at least one of a scope of the address components and an order of the address components in the concatenation can be varied individually in dependence on configuration parameters that have an influence on ranges of values of the various parameters.
   forming the value set form values including a virtual path identifier (VPI) value, a virtual channel identifier (VCI) value, and a physical port (PN) value, the VPI value and the VCI value designating an intended location of an asynchronous transfer mode (ATM) cell, and the PN value designating a site or origin of the ATM cell.

2. The method according to claim 1, which comprises performing the forming step in an asynchronous transfer mode (ATM) unit of a B-integrated services digital network system for enabling addressing a connection status information memory.

3. The method according to claim 2, which comprises selecting a first one of the configuration parameters in accordance with a capability of determining from the first one of the configuration parameters if a VPC value in an applicable switching station should or should not be resolved.

4. The method according to claim 3, which comprises selecting a second one of the configuration parameters in accordance with a capability of determining from the second one of the configuration parameters a maximum range of values of the PN value.

5. The method according to claim 4, which comprises selecting a third one of the configuration parameters in accordance with a capability of determining from the third one of the configuration parameters a maximum range of values of the VPI value.

6. The method according to claim 1, which comprises furnishing the configuration parameters in a form of exponents to a predetermined base.

7. The method according to claim 1, which comprises corresponding the address components to values of a given set, and canceling elements of no significance for address forming without replacement.

8. The method according to claim 1, which comprises:
   corresponding the address components to values of a given set;
   canceling elements of no significance for address forming; and
   replacing canceled elements with other elements.

9. A method by which sets of values representing various parameters can be allocated to addresses, and at the addresses, data pertaining to the sets of values can be stored in memory, which comprises:
   forming allocated addresses from address components formed by concatenation of individual values of a value set, and at least one of a scope of the address components and an order of the address components in the concatenation can be varied individually in dependence on configuration parameters that have an influence on ranges of values of the various parameters;
   forming the value set from values including a virtual path identifier (VPI) value, a virtual channel identifier (VCI) value, and a physical port (PN) value, the VPI value and the VCI value designating an intended location of an asynchronous transfer mode (ATM) cell, and the PN value designating a site of origin of the ATM cell;
   selecting a first one of the configuration parameters in accordance with a capability of determining from the first one of the configuration parameters if a VPC value in an applicable switching station should or should not be resolved; and
   selecting a second one of the configuration parameters in accordance with a capability of determining from the second one of the configuration parameters a maximum range of values of the PN value.

10. The method according to claim 9, which comprises performing the forming step in an asynchronous transfer mode (ATM) unit of a B-integrated services digital network system for enabling addressing a connection status information memory.

11. The method according to claim 9, which comprises selecting a third one of the configuration parameters in accordance with a capability of determining from the third one of the configuration parameters a maximum range of values of the VPI value.

12. The method according to claim 9, which comprises furnishing the configuration parameters in a form of exponents to a predetermined base.

13. The method according to claim 9, which comprises corresponding the address components to values of a given set, and canceling elements of no significance for address forming without replacement.

14. The method according to claim 9, which comprises:
 corresponding the address components to values of a given set;
 canceling elements of no significance for address forming; and
 replacing canceled elements with other elements.

\* \* \* \* \*